Oct. 24, 1967    T. R. SOWDER    3,348,499
TRAM CARRIER SWAY INDICATOR AND CONTROL
Filed Nov. 25, 1966    2 Sheets-Sheet 2
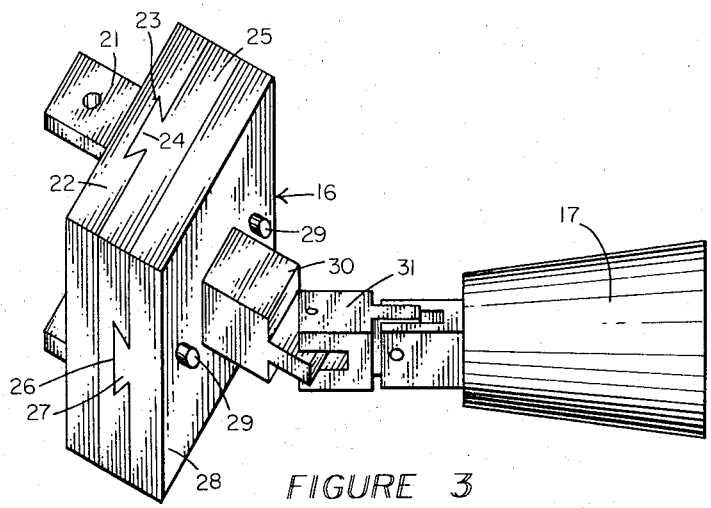
FIGURE 3
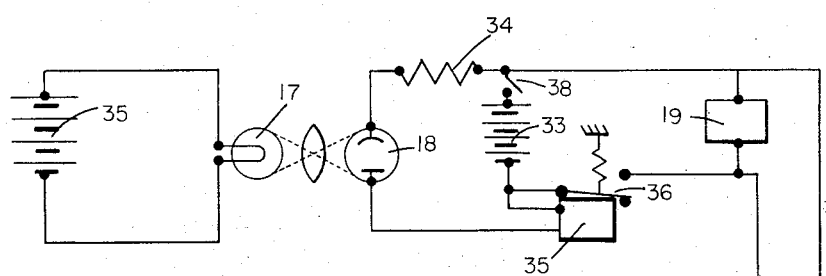
FIGURE 4
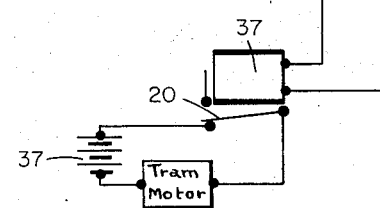
Tony R. Sowder, INVENTOR.
BY
ATTORNEY.

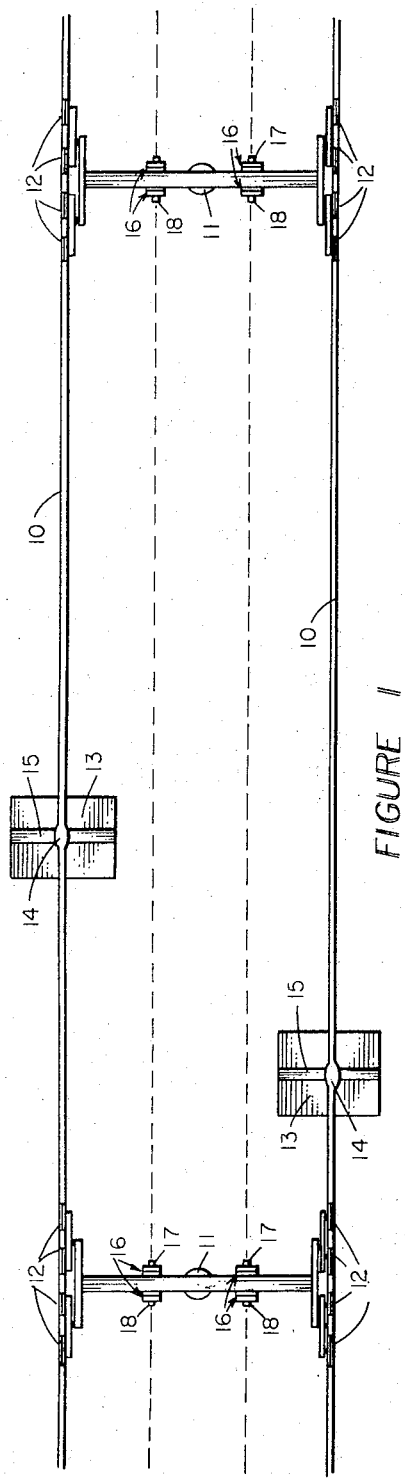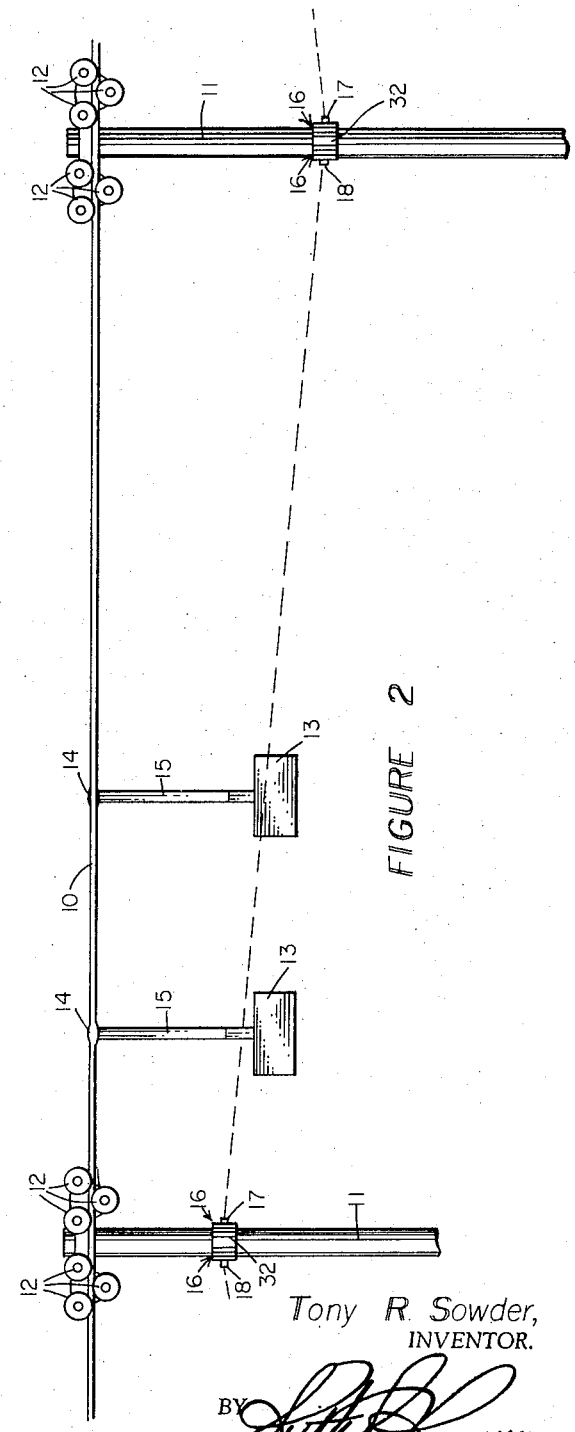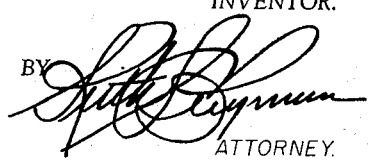

United States Patent Office 3,348,499
Patented Oct. 24, 1967

3,348,499
TRAM CARRIER SWAY INDICATOR AND CONTROL
Tony R. Sowder, 814 Grace Ave., Spokane, Wash. 99207
Filed Nov. 25, 1966, Ser. No. 596,981
5 Claims. (Cl. 104—178)

ABSTRACT OF THE DISCLOSURE

A sway indicator for aerial trams to determine, annunciate, and control the passage of tram carrier laterally beyond predetermined limits. A light beam is transmitted along a line outside the normal course of carrier travel but at least at some point tangent to it; the light beam is received by a photo receptor which senses any interruption of the beam, as by tram carrier presence therein, and annunciates the condition.

---

My invention reates generally to a device to annunicate the position of a tram carrier beyond the predetermined lateral limits relative its normal course of travel, and more particularly to such a device that uses light beams to make such determination and provide an electric annunciating signal that may also be used to stop tram motion.

Aerial tramways conventionally include an endless circulating traction rope trained about a powered driving sheave at one terminous and a spaced idling sheave, mounted on a carriage to form a tensioning system, at another terminous. Such traction rope is maintained at an appropriate level above the earth for carrier motion by plural rope guiding towers intermediate the terminals. These towers are provided with rope guiding sheaves disposed to maintain the circulating traction rope in its predetermined course of travel; normally such sheaves are vertically disposed but in some instances their plane may be oblique to the vertical. Carriers are suspended from the traction rope by off-set connectors adapted to pass freely over the supporting sheaves.

Such carriers are mechanically similar to a pendulum, relatively free to oscillate in a plane perpendicular to direction of carrier travel but relatively restrained from oscillation in a plane through the direction of travel by reason of the nature of carrier support-traction rope communication. Oscillatory motion of the carriers during operation of the tram is not desirable as it oftentimes causes the carriers to strike supporting towers or other objects outside the normal course of carrier travel and it may also cause the traction rope to leave its normal channels of restraint.

Such oscillatory motion may be caused by forces within the tram system itself or by natural external forces, such as wind. In any event oscillation of the carrier, whatever the cause, is not desirable and it is advantageous to annunciate its happening so that appropriate steps may be taken to stop the unwanted motion and prevent injury to the carrier system or its environs.

With this background in mind the instant invention was conceived to provide means of determining when oscillating carriers have passed predetermined lateral limits and to annunicate such fact. In so doing it is:

A principal object of my invention to provide a non-mechanical sensing system to determine and annunciate oscillatory motion of tram carriers, in a plane perpendicular to the normal course of carrier travel, in excess of predetermined limits.

A further object of my invention to provide such a sensing device that has no physical structure placed to interfere with the normal travel of tram carrier or associated structures.

A further object of my invention to provide such a device that senses carrier position by interruption of a beam of light so that no mechanical linkage is required between sening units or between sensing unit and carrier.

A still further object of my invention to provide such a device that will annunciate not only upon sensing of carrier position but also upon failure of the sensing system and one that may also communicate with tram activating structures to deactivate the tram upon such annunciation.

A still further object of my invention to provide such a sensing device that is of new and novel design, of simple and economic manufacture, of rugged and durable nature and one that is otherwise well adapted to the uses and purposes for which it is intended.

These and other objects of my invention will become apparent from a consideration of the following specification and accompanying drawings. In carrying out the objects of my invention, however, it is to be understood that its essential features are susceptible of change in design and structural arrangement, with only one preferred and practical embodiment being illustrated and specified as required.

In the accompanying drawings, wherein like numbers of reference refer to similar parts throughout:

FIGURE 1 is an orthographic top or plan view of a generalized section of opposed courses of a traction rope tram with two attached carriers supported between two intermediate towers.

FIGURE 2 is a vertical, orthographic view of the same portion of tram system as shown in FIGURE 1, illustrating my invention from this aspect.

FIGURE 3 is an enlarged, isometric view of one form of adjustable mounting of photoelectric elements of my invention.

FIGURE 4 is an electric diagram in normal symbology, showing the electric circuitry of my invention.

Referring now to the drawings in more detail and particularly to those of FIGURES 1 and 2, there will be seen a section of traction rope 10 supported for motion on intermediate towers 11 by plural sheaves 12. The traction rope supports carrier 13 by connector 14 rigidly communicating with support arm 15 of the carrier structure. Intermediate support towers 11 position traction rope 10 so that carriers 13 have a clear course of travel within laterally spaced predetermined limits. Traction rope 10 must obviously be carried at a laterally spaced distance from tower 11 to allow the carrier free passage thereby; generally, with this structure the tower serves as a limit of the clear course of carrier travel.

Commonly in tram structures both the forward and return course of the traction rope are supported on the same intermediate towers 11 by positioning one course on each side. Since the function of my invention is related directly to one traction rope course, it will be described in this relationship, with the understanding that it may be duplicated for complex units.

My sensing unit per se comprises, generally, similar mounting structures 16 positioned appropriately upon towers 11 to mount paired opposed, cooperating light units 17 and photoelectric receptor units 18 adapted to activate electrical circuitry operating annunciator 19 and relay switch 20 upon interruption of light between light units 17 and photocells 18.

Mounting structures 16 are shown in the detailed view of FIGURE 3, where they are seen to include bracket 21 mounting the unit structurally on tower 11 and communicating structurally with base plate 22. This base plate in turn slideably communicates by dovetail groove 23 with mating tenon 24 of vertical motion plate 25. A similar dovetail groove 26 in the opposite face of the vertical motion plate slideably communicates with mating tenon 27 of horizontal motion plate 28. The motion plates 25, 28 may be releaseably positioned by set screws 29 threadedly communicating through the motion plate into engagement with tenons 24, 27. Horizontal motion plate 28 structurally carries mounting arm 30, carrying at its outward extension universal joint 31 providing limited angular motion for photoelectric devices 17, 18 mounted thereby. This type of structure is well known in mechanical arts to provide limited horizontal, vertical and angular motion for a mounted unit.

Mounting structures 16 are positioned in cooperating pairs adjacent towers 11, one mounting structure carrying a light unit 17 and its opposed mate carrying a photoelectric receptor unit 18. The positioning of these units is somewhat critical and essential to the operation of my invention. The units must be positioned so that a straight line therebetween defines the desired lateral limits of motion of carrier 13, at at least some point, and yet the units are nowhere within the normal range of motion of the carrier. This mounting may be simply accomplished, as illustrated particularly in FIGURE 2, by positioning one mounting structure 16 on a laterally projecting mounting arm 32 on tower 11 below the normal course of carrier travel and mounting the opposed cooperating structure on the adjacent tower on a similar laterally projecting mounting arm 32 above the normal course of travel of carrier 13. As the lateral limits of motion of a carrier defined by the line between paired photoelectric units might change on occasion, it is desirable that the mounting structure 16 be adjustable as afore-provided to allow for such changes. If one fixed limit is desired, however, obviously the photoelectric units could be positioned in a stationary fashion relative towers 11.

Both light units 17 and photosensitive receptor units 18 are of normal commercial design. It is preferable that the light units 17 have a focusing or beam limiting device, preferably of the lens type, so that light emitted thereby might be sufficiently concentrated in a relatively narrow cone to allow ready distinguishment from background interference. Receptor 18 is preferably of a similar type adapted to receive light from a relatively narrow, directionally oriented entrance apperature.

A form of electric circuitry for my invention is shown in the diagram of FIGURE 4, where it is seen to include an electric power source 33 communicating in a first series circuit through resistor 34, resistance type photoelectric cell 18, relay 35 of spring biased switch 36 and thence back to the power source to complete the circuit. A second circuit communicates from power source 33 in series through spring biased normally open switch 36, controlled by relay 35, and thence in parallel with annunciator 19 and relay 37 of tram operation switch 20.

Light source 17 is preferably supplied with energy by a separate power source 36, but obviously could, if desired, be supplied by the source 33.

With this sensing circuitry, so long as photoelectric cell 18 remains activated by appropriate threshold light from source 17, its resistance will be lowered and current will flow through the first series circuit to activate relay 35 and thusly maintain switch 36 in open condition. Upon failure of light from source 17, upon interruption by a tram carrier or otherwise, resistance in the photoelectric cell will increase, and the current in the circuit correspondingly decreased to inactivate relay 35. Switch 36 will then close to its spring biased position to allow current to flow in the second circuit to activate annunciator 19 and relay 37, thus opening tram operation switch 20. This circuitry will thus be of a "fail safe" type—one that annunciates upon failure of the circuit as well as upon happening of the predetermined contingency.

With this description of the mechanism of my invention, its operation may now be understood.

Paired sets of light units 17 and photosensitive receptors 18 are positioned on adjacent intermediate supports as described, with the line between them describing, on at least one of its points and preferably substantially more, the limits of lateral motion of carriers 13. The line nowhere passes within the normal channel of motion of the carrier as defined by such lateral limits. With this path between units 17, 18 being normally clear, light will pass from the light unit through the intervening air to the receptor unit 18 to maintain it in a low resistance state to pass current through the photocell circuit. If, however, carrier 13 passes without the lateral limit prescribed for it, the path of light between unit 17 and receptor 18 will be interrupted by the carrier and photocell 18 will fail to pass current thus causing current to flow in the annunciator circuit to activate both annunciator 19 and relay switch 20, indicating the carrier motion and stopping the motion of the tram unit before damage is done to it.

The positioning of light and photoelectric units in an individual instance is dependent largely upon the particular configuration of those units and the tram structure, but since the carrier 13 has some physical size, this will allow an angular positioning in a vertical plane of light and receptor units 17, 18 as indicated, and still provide a sensing area along a sufficient portion of the lateral limits of the length of travel of carrier 13 to indicate oscillatory motion therein no matter where along the carrier course the amplitude of lateral oscillation may occur.

Generally it is desirable to position such units on all adjacent intermediate towers so that there is a signaling system between any two adjacent towers, though, of course, such positioning is not necessary. Oscillatory motion of carriers 13, if more prevalent in only a particular area of tram travel, may be determined only in that area, as in the case of freight trams most generally near the point of loading or discharge or in the case of trams set in motion by wind, in the area of wind activity. Obviously any number of such units might be joined on a tram system to provide the desired degree of coverage.

It should be noted that it is necessary to place my sensing unit only on one side of a tram to determine lateral motion of the carrier, as that motion will be very nearly symmetrical on both sides of the traction rope—if the carrier swings outside lateral limits on one side, it also will do so on the other side. If the outgoing and return tram courses be supported on both sides of the same supports, generally one sensing set will be required for each course between the same supports as each set must usually be lateral of the support.

In some instances particularly if trams are operating in areas having atmosphere contaminated by physical substances, it may be desirable to use a coherent longer than normal type of light wage, particularly one in the infrared range, so that the physical substances do not unreasonably interfere with the operation of the device. In the case of snow it may be desirable to use waves longer than those optically discernible, approaching short radio or radar waves, as obviously my invention could be readily adapted to make use of this longer radiation.

The foregoing description of my invention is necessarily of a detailed nature so that a specific embodiment of it may be set forth as required, but it is to be understood that various modifications of detail, rearrangement and multiplication of parts may be resorted to without departing from its spirit, essence or scope.

Having thusly described my invention, what I desire to protect by Letters Patent, and, what I claim is:

1. In a tram of the nature having a circulating traction rope supported by plural towers with depending carriers supported for motion by said traction rope, a carrier sway indicator of the nature aforesaid, comprising, in combination:

paired opposed mounting brackets structurally carried by adjacent tram towers so that a line passing therethrough is substantially tangent to the lateral limit of travel of a tram carrier at at least some point thereon but no part of said line is within the normal course of travel of said tram carrier;

a light source, carried by one of said mounting structures, directing a discernible cone of light to said other mounting structure;

a photoelectric cell carried by said other mounting structure adapted to operatively receive aforesaid cone of light transmitted thereto by aforesaid light source; and electrical circuitry communicating with said photoelectric device to annunciate upon interruption of the light beam between said light and said photoelectric cell.

2. The invention of claim 1 further characterized by said electric circuitry comprising a first sensing circuit including a source of electric energy in series with said photoelectric cell and each in series with the relay of a spring biased closed, normally open switch activated by said relay and a second annunciator circuit including an electric power source in series with aforesaid switch and in parallel with at least one annunciator.

3. The invention of claim 1 further characterized by said electric circuitry comprising a first sensing circuit including a source of electric energy in series with said photoelectric cell and each in series with the relay of a spring biased closed, normally open switch activated by said relay and a second annunciator circuit including an electric power source in series with aforesaid switch and in parallel with at least one annunciator and a relay activating switch adapted to stop tram motion.

4. A tram-carrier lateral sway indicator of the nature aforesaid, comprising, in combination:

paired opposed signal and photoelectric receptor elements operatively related and positioned without the normal course of travel of a tram carrier and its ancillaries, with a line therebetween substantially tangent to the normal course of travel of said carrier at at least one point thereon, no part of said line being within said normal course of travel; and annunciating means associated with said photoelectric receptor adapted to annunciate upon failure of presentment of light thereto by passage of said tram carrier through said light line.

5. The invention of claim 4 further characterized by said annunciating means operatively communicating with said tram motive means to stop tram motion upon annunciation.

References Cited

UNITED STATES PATENTS

| | | | |
|---|---|---|---|
| 2,208,420 | 7/1940 | Gulliksen | 226—20 |
| 2,299,798 | 10/1942 | Colson | 33—1250 |
| 2,566,399 | 9/1951 | Bishop | 226—20 |
| 2,832,426 | 4/1958 | Seargeant | 104—7 |
| 3,033,305 | 5/1962 | Harned | 180—82 |
| 3,096,919 | 7/1963 | Snyder | 226—20 |
| 3,115,847 | 12/1963 | Turner | 104—178 |

ARTHUR L. LA POINT, *Primary Examiner.*

D. F. WORTH, *Assistant Examiner.*